(12) United States Patent
Allen et al.

(10) Patent No.: US 9,291,297 B2
(45) Date of Patent: Mar. 22, 2016

(54) MULTI-LAYER PHONONIC CRYSTAL THERMAL INSULATORS

(71) Applicant: Elwha LLC, Bellevue, WA (US)

(72) Inventors: Paul G Allen, Mercer Island, WA (US); Jeffrey A. Bowers, Issaquah, WA (US); Kenneth G. Caldeira, Redwood City, CA (US); William D. Duncan, Kirkland, WA (US); Roderick A. Hyde, Redmond, WA (US); Muriel Y. Ishikawa, Livermore, CA (US); Edward K.Y. Jung, Bellevue, WA (US); Jordin T. Kare, Seattle, WA (US); John Latham, Boulder, CO (US); Eric C. Leuthardt, St. Louis, MO (US); Nathan P. Myhrvold, Medina, WA (US); Thomas J. Nugent, Jr., Bellevue, WA (US); Stephen H. Salter, Edinburgh (GB); Clarence T. Tegreene, Mercer Island, WA (US); David B. Tuckerman, Lafayette, CA (US); Thomas A. Weaver, San Mateo, CA (US); Charles Whitmer, North Bend, WA (US); Lowell L. Wood, Jr., Bellevue, WA (US); Victoria Y. H. Wood, Livermore, CA (US)

(73) Assignee: Elwha LLC, Bellevue, WA (US)

( * ) Notice: Subject to any disclaimer, the term of this patent is extended or adjusted under 35 U.S.C. 154(b) by 0 days.

(21) Appl. No.: 13/720,717

(22) Filed: Dec. 19, 2012

(65) Prior Publication Data

US 2014/0170392 A1    Jun. 19, 2014

(51) Int. Cl.
*F16L 59/02* (2006.01)
*B82Y 40/00* (2011.01)

(52) U.S. Cl.
CPC ......... *F16L 59/029* (2013.01); *B32B 2307/206* (2013.01); *B32B 2307/304* (2013.01);
(Continued)

(58) Field of Classification Search
CPC ................ H01L 45/1293; B82Y 15/00; B32B 2307/206; B32B 2307/304; B23B 2307/30; F16L 59/00; F16L 59/029; Y10T 428/24942
USPC ............................. 428/131; 252/62; 136/200
See application file for complete search history.

(56) References Cited

U.S. PATENT DOCUMENTS 5,411,599 A   5/1995   Horn et al.
5,525,162 A   6/1996   Horn et al.
(Continued)

FOREIGN PATENT DOCUMENTS

WO    WO-2008/073668    6/2008

OTHER PUBLICATIONS

English et al, "Enhancing and tuning phonon transport at vibrationally mismatched solid-solid interfaces", Jan. 23, 2012, Physical Review B: Condensed matter and Materials Physics, vol. 85, Issue 3, pp. 035438/1-035438/14.*

(Continued)

*Primary Examiner* — Aaron Austin
*Assistant Examiner* — Jasper Saberi
(74) *Attorney, Agent, or Firm* — Foley & Lardner LLP

(57) ABSTRACT

A thermal insulator includes a plurality of layers. At least some of the layers include phononic crystals having a phononic bandgap, wherein heat transporting phonons within a selected range of frequencies are substantially blocked by each phononic crystal layer. The plurality of layers thermally isolate a first region from a second region, wherein the first region is at one end of the plurality of layers and the second region is at the other end of the plurality of layers.

34 Claims, 4 Drawing Sheets

(52) U.S. Cl.
CPC ............ *B82Y40/00* (2013.01); *Y10T 29/49826* (2015.01); *Y10T 428/24752* (2015.01); *Y10T 428/24802* (2015.01); *Y10T 428/24942* (2015.01)

(56) References Cited

U.S. PATENT DOCUMENTS

| | | | |
|---|---|---|---|
| 5,900,071 | A | 5/1999 | Harman |
| 5,917,195 | A | 6/1999 | Brown |
| 6,025,078 | A | 2/2000 | Rickerby et al. |
| 6,110,604 | A | 8/2000 | Rickerby |
| 6,882,051 | B2 | 4/2005 | Majumdar et al. |
| 6,996,147 | B2 | 2/2006 | Majumdar et al. |
| 7,255,846 | B2 | 8/2007 | Ren et al. |
| 7,306,828 | B2 | 12/2007 | Barrera et al. |
| 7,442,599 | B2 | 10/2008 | Maa et al. |
| 7,453,081 | B2 | 11/2008 | Happ et al. |
| 8,094,023 | B1 * | 1/2012 | El-Kady et al. ............ 340/572.1 |
| 2002/0172820 | A1 | 11/2002 | Majumdar et al. |
| 2002/0175408 | A1 | 11/2002 | Majumdar et al. |
| 2005/0150537 | A1 | 7/2005 | Ghoshal |
| 2005/0161662 | A1 | 7/2005 | Majumdar et al. |
| 2006/0097241 | A1 | 5/2006 | Harris et al. |
| 2006/0286488 | A1 | 12/2006 | Rogers et al. |
| 2007/0027979 | A1 | 2/2007 | Emerson et al. |
| 2007/0082200 | A1 | 4/2007 | Gruen |
| 2007/0164270 | A1 | 7/2007 | Majumdar et al. |
| 2007/0235070 | A1 | 10/2007 | Ila |
| 2008/0092938 | A1 | 4/2008 | Majumdar et al. |
| 2009/0051032 | A1 | 2/2009 | Segal et al. |
| 2009/0098027 | A1 | 4/2009 | Tabata et al. |
| 2012/0097204 | A1 | 4/2012 | Yu et al. |
| 2012/0138864 | A1 * | 6/2012 | Steinhardt et al. ............ 252/500 |
| 2012/0171411 | A1 * | 7/2012 | Lashmore et al. ............ 428/114 |

OTHER PUBLICATIONS

American Heritage Dictionary Entry_cascade, https://www.ahdictionary.com/word/search.html?q=cascade.*

American Heritage Dictionary Entry_cascade, https://www.ahdictionary.com/word/search.html?q=cascade, Apr. 29, 2015.*

13720717-483224 EIC Search, Apr. 27, 2015.*

NanoPore Thermal Insulation, from nanopore.com (www.nanopore.com/thermal.html), retrieved on Mar. 22, 2013, 2 pages.

PCT International Search Report; International App. No. PCT/US2013/075432; Mar. 10, 2014; pp. 1-3.

* cited by examiner

MULTI-LAYER PHONONIC CRYSTAL THERMAL INSULATORS

BACKGROUND

Phononic crystals are synthetic materials that are formed by arranging materials in a periodic array or lattice structure. The periodic structure of phononic crystals has profound effects on wave propagation throughout the crystals. Periodic variation of the acoustic properties of the material can introduce phononic bandgaps into the crystals, in which certain frequencies of phonons cannot propagate. It is possible to adjust the acoustic and thermal properties of the crystals by adjusting the phononic bandgaps.

SUMMARY

One exemplary embodiment relates to a thermal insulator. The thermal insulator includes a plurality of layers, at least some of the layers including phononic crystals having a phononic bandgap, wherein heat transporting phonons within a selected range of frequencies are substantially blocked by each phononic crystal layer. The plurality of layers thermally isolate a first region from a second region, wherein the first region is at one end of the plurality of layers and the second region is at the other end of the plurality of layers.

Another exemplary embodiment relates to a thermally insulated system. The system includes a plurality of laterally arranged thermal insulators each including a plurality of layers, at least some of the layers comprising phononic crystals having a phononic bandgap, wherein heat transporting phonons within a selected range of frequencies are substantially blocked by each phononic crystal layer. The plurality of layers inhibits heat flow therethrough and each of the thermal insulators are coupled to at least one other thermal insulator.

Another exemplary embodiment relates to a method for providing thermal insulation. The method includes providing a plurality of layers, at least some of the layers comprising phononic crystals having a phononic bandgap, and arranging the plurality of layers into a multilayer structure, wherein the plurality of layers thermally isolates a first region from a second region, wherein the first region is at one end of the plurality of layers and the second region is at the other end of the plurality of layers.

The invention is capable of other embodiments and of being carried out in various ways. Alternative exemplary embodiments relate to other features and combinations of features as may be generally recited in the claims.

The foregoing is a summary and thus by necessity contains simplifications, generalizations and omissions of detail. Consequently, those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE FIGURES

The invention will become more fully understood from the following detailed description taken in conjunction with the accompanying drawings wherein like reference numerals refer to like elements, in which.

DETAILED DESCRIPTION

Figure 1:
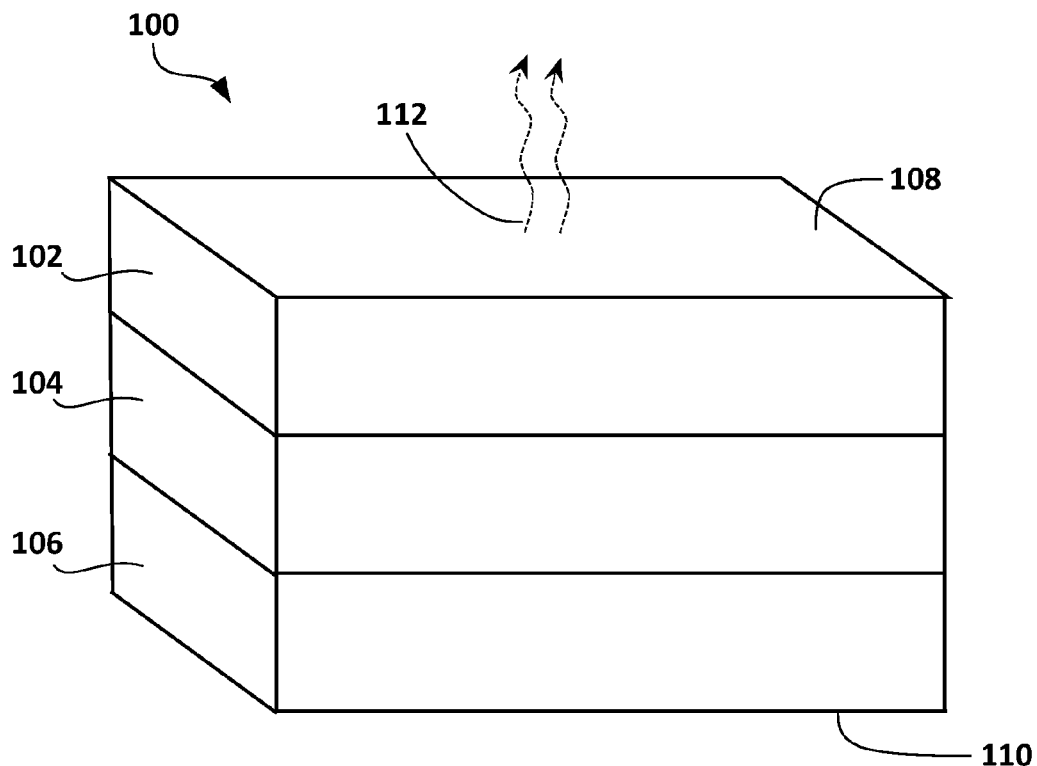
FIG. 1 is a schematic diagram of multilayer structure comprised of phononic crystals, and a heat path is shown according to an exemplary embodiment.

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting.

Referring generally to the Figures, systems and methods of using phononic crystals for thermal insulators are shown. Phononic crystals are composite materials that are formed with periodic variations of material properties. For example, the variations can be of density, mass, elasticity, etc. Variations may also be of the crystal structure of the phononic crystals Variations of the crystal structure may be one-dimensional, two-dimensional, or three-dimensional variations, as needed for a particular application. Such variations can be used to introduce phononic bandgaps into the material due to destructive interference of phonon propagation through the material. The spacing and the arrangement of the variations and phononic crystal interfaces allows for the tuning of the bandgap of a layer. Thermal energy may be transported by phonons, however, phonons of a wavelength at a frequency corresponding to a bandgap cannot propagate therethrough.

The thermal conductivity of a solid includes contributions from the collection of available phonon modes. A classical formulation of this for a simple $\omega(k)$ dispersion relation and modal distribution $D(\omega)$, is:

$$\lambda = \frac{\hbar^2}{3k_B T^2 V} \int_0^{\omega_D} v(\omega)^2 \tau(\omega) D(\omega) \omega^2 \frac{e^{\hbar \omega . k_B T}}{(e^{\hbar \omega / k_B T} - 1)^2} d\omega$$

See Chantrenne, P., and Barrat, J. L., *Analytical Model for the Thermal Conductivity of Nanostructures*, Superlattices and Microstructures, Vol. 35, 173-186 (2004).

While this conductivity integral (and more complex analogs) shows that all phonon frequencies, $\omega$, contribute to the thermal conductivity, the largest contribution generally occurs at frequencies near the peak of the Boltzman distribution, i.e., for frequencies, $\omega \sim k_B T/\hbar$. Accordingly, use of a phononic crystal with a bandgap such that such frequencies are blocked will be effective in reducing the thermal conductivity. The potential of using phononic crystals to reduce thermal conductivity by forming bandgaps near the peak of the Boltzman distribution has been previously discussed. (See U.S. Pat. No. 8,094,023 to El-Kady et al., and P. E. Hopkins et al., *Phonon Considerations in the Reduction of Thermal Conductivity in Phononic Crystals*, Applied Physics A, Vol. 103, 575-579 (2011).) Achieving a large reduction in the thermal conductivity depends on the ability to block a wide range of frequencies covering the peak of the conductivity integrand, typically frequencies near $k_B T/\hbar$. For operation near room temperature, this corresponds to THz frequencies, and accordingly to photonic crystals having nanometer scale lattice spacings. Because the spectral width of the conductivity integrand is broad, it is useful to block a wide range of frequencies covering as much of the spectral peak of the integrand as possible.

Phononic crystals can achieve full or partial bandgaps for certain phononic modes. Partial bandgaps (i.e., blocking some, but not all, wavevectors at a given frequency) and density-of-state reductions can be useful in reducing thermal conductivity, particularly if the effects occur over a wide range of the relevant phononic frequencies. Complete bandgaps (i.e., blocking all wavevectors at a given frequency), will be even more effective, depending on the range of frequencies over which the gap extends. A phononic crystal achieves a bandgap due to destructive interference of the vibrations of materials within its crystal lattice; this interference is effective only for a limited range of frequencies. When comparing the width of the band gap, to a reference frequency based on the phononic crystal's lattice spacing, typical bandgaps are of order 10%. Phononic crystals having wider, ~50%, bandgaps have been designed, for instance, by optimizing the layout and acoustic mismatch of the crystals' constituents (see Lai, Y., *The Study of Band Gap Engineering for Phononic Crystals and Gap Structures in Phononic Quasicrystals*, Ph.D. Thesis, The Hong Kong University of Science and Technology, Dept. of Physics, (2005)), or by using phononic crystal slabs (see Khelif et al., *Complete Band Gaps in Two-Dimensional Phononic Crystal Slabs*, Phys. Rev. E, Vol. 74, 046610, 1-5 (2006)). However, to maximize thermal conductivity reductions, it is desirable to achieve band gaps over even wider portions of the spectrum, more than can be achieved for a single phononic crystal.

Phononic crystals can be formed using a variety of different physical layouts and materials. They may employ periodic arrangements of two (or three or more) different materials. While one of the materials is generally a solid, the other(s) may be a gas (or voids), may be a liquid, or may be another solid material. The phononic crystal may be one-dimensional, comprising a periodic arrangement of planar layers. The phononic crystal may be two-dimensional, comprising a rectangular or hexagonal arrangement of one or more materials in a matrix of another material. The phononic crystal may be three-dimensional, comprising a periodic array defined by different symmetries or Bravais Lattices (e.g., cubic, hexagonal, tetragonal, rhombohedral, orthorhombic). The phononic crystal can be a quasicrystal, without complete periodicity; bandgaps in phononic quasicrystals are discussed in the aforementioned Ph.D. Thesis by Lei.

Phononic crystals may be layered in sets to form a multilayer structure, with each phononic crystal layer having a corresponding bandgap. The multilayer structure may be in the form of a superlattice and may be comprised of layers of phononic crystals by themselves, or in combination with layers of other non-phononic crystal material. The multilayer structure may be used as a thermal insulator. Such an insulator may function in air, a vacuum, or other medium, etc. Additionally, acoustic bandgaps may be introduced in addition to the phononic bandgaps of the layers for both vibrational and thermal insulation. Other vibrational isolation layers may also be introduced into the multiplayer structure. In one embodiment, the insulator comprises a sequence of discrete phononic crystal layers, one after the other. The phononic crystal layers may contact each other, or they may be separated by layers of vibrationally mismatched material, so as to form a sequence of distinct phononic crystal slabs. In another embodiment, the insulator comprises a single, gradually varying, phononic crystal in which the lattice spacing changes from one side of the insulator to the other. Lattice spacing of phononic crystal layers may also be the same or different.

The sequence of layers can have monotonic (increasing or decreasing) bandgaps, can have large (up or down) bandgap jumps, can have random bandgap jumps, etc., and a variety of frequencies of phonons may be blocked. The sequence of layers may include non-phononic crystal layers interspersed there between. In one embodiment there are ten layers within a multilayer structure of an insulator. The insulator is designed to block a certain thermal spectrum. The bandgaps of the ten layers correspond to different wavelengths of the thermal spectrum, and the ten layers are randomly distributed throughout the multilayer structure. In another embodiment there are five layers within a multilayer structure of an insulator. The insulator is designed to block a certain thermal spectrum. The bandgaps of the five layers correspond to different wavelengths of the thermal spectrum, and the five layers are distributed throughout the multilayer structure in order of increasing bandgap frequency. The frequencies corresponding to the bandgaps of layers may be selected to correspond to a particular application. For example, certain heat transporting phonons may be desired to be blocked, or certain heat transporting phonons may be desired to be allowed to propagate. The thermal frequency spectrum for that temperature range may be analyzed and used to design an insulator for a particular temperature range (e.g., the bandgaps within the multilayer structure may be selected according to the frequency spectrum of the temperature range).

Additionally, the multilayer structures or individual layers may be laterally positioned in order to channel heat flow along desired paths, or away from other paths. The multilayer structures or individual layers may also be arranged to enhance anisotropic heat flow, enhancing the ratio of along-layer flow to that of across-layer flow. The bandgaps or layers may also be laterally patterned to thermally-shield specific regions of space more than other regions.

Referring to FIG. 1 a schematic diagram of multilayer structure 100 is shown according to an exemplary embodiment. Multilayer structure 100 is shown as having three layers of phononic crystals, 102, 104, and 106. Although depicted as only three layers, it should be understood that the scope of the present disclosure is not limited to any particular number of layers. Phononic crystal layer 102, phononic crystal layer 104, and phononic crystal layer 106 each have phononic bandgaps.

In one embodiment, the layers are arranged such that the bandgaps of each layer overlap the bandgap of another layer. For example, the energy required to bridge the bandgap of one layer may overlap the energy required to bridge the gap of a second layer. In another embodiment, the layers are arranged such that the bandgaps of each layer do not overlap the bandgaps of other layers. In another embodiment, the bandgaps of layers 102, 104, and 106 are increasing or decreasing to form a continuous gradation of bandgaps. In another embodiment, the bandgaps of layers 102, 104, and 106 are monotonically spaced. In another embodiment, the bandgaps of layers 102, 104, and 106 are randomly distributed throughout multilayer structure 100. As an example, a random distribution of bandgaps may be used to counteract the rethermalization of energy as phonons propagate therethrough. In another embodiment, the layers are in an order such that there are bandgap jumps throughout multilayer structure 100.

FIG. 1 is further shown as having regions 108 and 110, and heat path 112. Region 108 is at one end of multilayer structure 100, and region 110 is at the other end. Heat path 112 is shown in a direction that is normal to layers 102, 104, and 106, however, alternative heat paths are envisioned. In one embodiment, the bandgaps of layers 102, 104, and 106 correspond to a certain temperature range that is desired to be blocked. By blocking thermal transporting phonons having frequencies within the temperature range, region 108 is thermally isolated from region 110.

In one embodiment, the bandgaps of layers 102-106 are selected to facilitate the propagation of only certain phonon frequencies and modes. This may be used to allow temperature sensing of selected temperatures through multilayer structure 100. As an example, multilayer structure 100 may be coupled to the thermal sensor of a device. Multilayer structure 100 may thermally isolated the device, while allowing the thermal sensor to detect heat flow corresponding to the allowed phonon frequencies of the layers.

Figure 2:
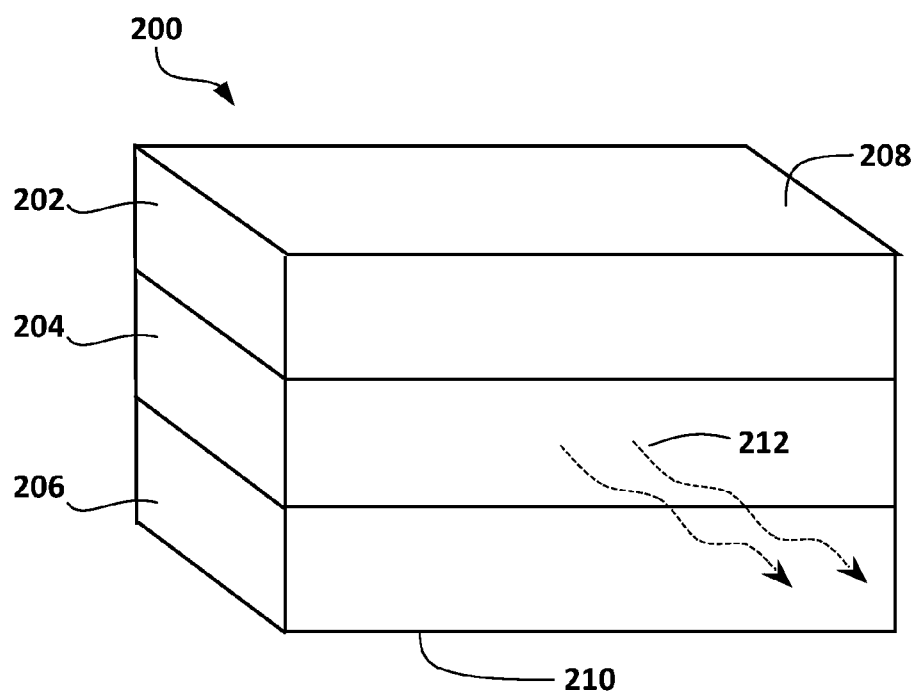
FIG. 2 is a schematic diagram of multilayer structure comprised of phononic crystals, and a heat path is shown according to an exemplary embodiment.

Referring to FIG. 2, a schematic diagram of multilayer structure 200 is shown according to an exemplary embodiment. Multilayer structure 200 is shown as having three layers of phononic crystals, 202, 204, and 206. Phononic crystal layer 202, phononic crystal layer 204, and phononic crystal layer 206 each have phononic bandgaps. Multilayer structure 200 further contains regions 208 and 210, and heat path 212. Region 208 is at one end of multilayer structure 200 and region 210 is at the other end. Heat path 212 is within the plane of layer 204 of multilayer structure 200. It should be understood, that the scope of the present disclosure is not limited to a certain orientation or number of heat paths. Heat path 212 may be used to direct heat to third region 214. For example, this may be used to channel heat along heat path 212 to a desired location. In another example, heat path 212 may be used to channel heat away from an undesired location (e.g., region 208, region 210, etc.). Each layer may or may not be electrically conducting along the heat path (e.g., heat path 212).

Figure 3:
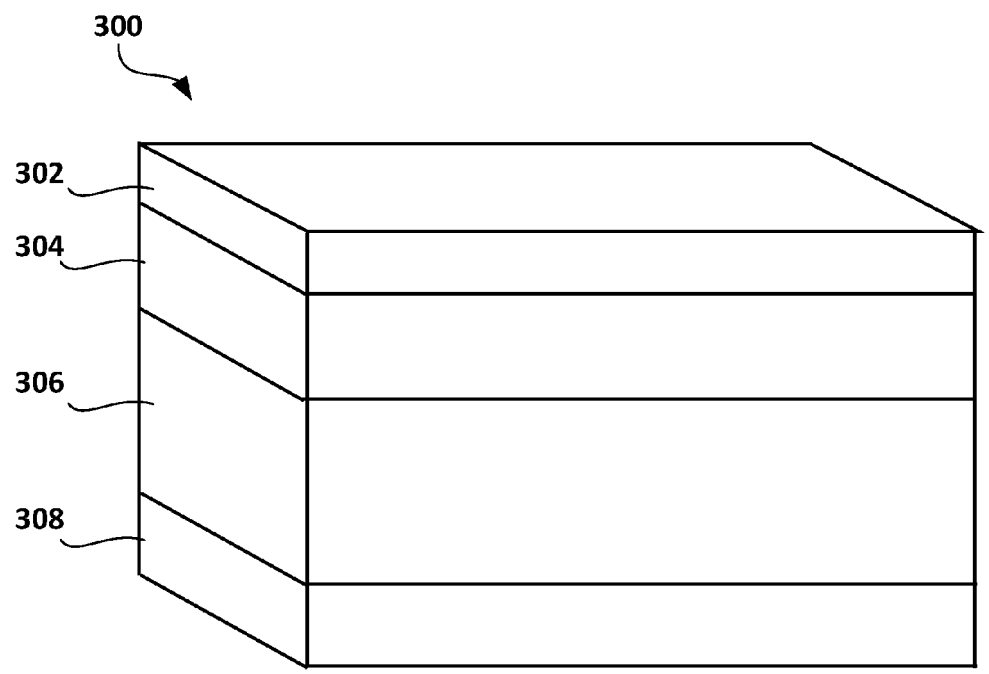
FIG. 3 is a schematic diagram of multilayer structure comprised of phononic crystals, and a heat path is shown according to an exemplary embodiment.

Referring to FIG. 3 a schematic diagram of multilayer structure 300 is shown according to an exemplary embodiment. Multilayer structure 300 is shown as having four layers of phononic crystals, 302, 304, 306, and 308. Phononic crystal layer 302, phononic crystal layer 304, phononic crystal layer 306, and phononic crystal layer 308 each have phononic bandgaps. Each layer in multilayer structure 300 may be of a same or different material combination and be of different thickness and may be highly structured. Each layer in multilayer structure 300 may also include other materials to form its bandgap. In one embodiment, layer 302 contains doping atoms. In another embodiment, layer 304 contains nanoparticles. In another embodiment, layer 306 contains nanowires. In another embodiment, layer 308 contains nanocrystals. In another embodiment, layer 302 contains nanopores. In another embodiment, layer 304 contains lithographically defined features. In another embodiment, layer 306 contains nano-machined nano holes. In another embodiment, layer 306 contains nanofibers. In another embodiment, layer 306 contains nanofilaments. It should be understood that a layer may contain any number of materials or voids (e.g., doping atoms, nanowires, nanocrystals, nanopores, quantum wells, quantum dots, lithographically defined features, nano-machined nano vacancies or holes, nanofibers, nanofilaments, etc.). The selection of materials of a layer may depend on a desired bandgap.

Figure 4:
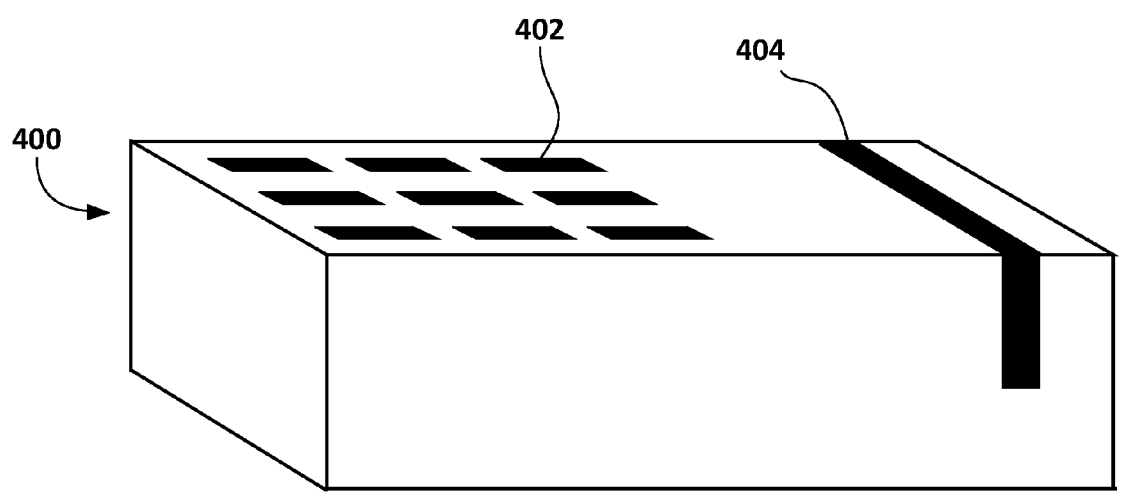
FIG. 4 is a schematic diagram of phononic crystal layer is shown according to an exemplary embodiment.

Referring to FIG. 4, a schematic diagram of phononic crystal layer 400 is shown according to an exemplary embodiment. Phononic crystal layer 400 may be a layer within a multilayer structure (e.g., multilayer structure 300 of FIG. 3). Phononic crystal layer 400 further contains removed material locations 402. Phononic crystal layer 400 may be partially removed to create voids within the layer. Such voids may contribute to the formation of the layer's corresponding bandgap. Removed of material may be of the nanoscopic scale or microscopic scale, etc. Removed material locations 402 may be in highly ordered one-dimensional, two-dimensional, or three-dimensional structures. Removed material locations 402 may be randomly, but uniformly distributed. Phononic crystal layer 400 further contains dislocation 404 of layer material. As an example, dislocations of a layer's material may be used in forming the bandgap of the layer. In one embodiment, the bandgap of phononic crystal layer 400 is formed through removal of material at the nanoscale. In another embodiment, the bandgap of phononic crystal layer 400 is formed through creating dislocations in the layer material. In another embodiment, the bandgap of phononic crystal layer 400 is formed through both removal of layer material and dislocations of the layer material.

Figure 5:
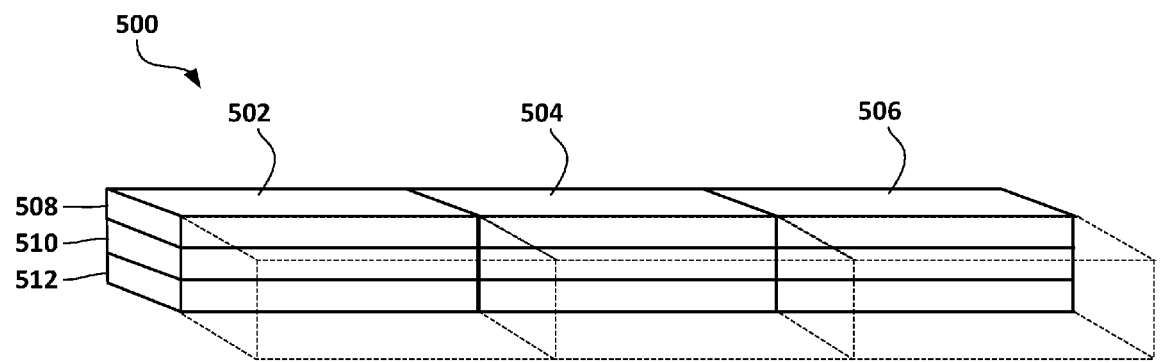
FIG. 5 is a schematic diagram of a thermal shielding, comprising multilayer structures of phononic crystals, shown according to an exemplary embodiment.

Referring to FIG. 5, a schematic diagram of thermal shielding 500 is shown according to an exemplary embodiment. Thermal shielding 500 includes multilayer structures of phononic crystals 502, 504, and 506, that are coupled. Multilayer structures 502, 504, and 506 may be multilayer structures as described herein (e.g., multilayer structure 100 of FIG. 1, etc.). Each layer 508, 510, and 512 of multilayer structure 502 may be a layer as described herein (e.g. layers 102, 104, and 106 of FIG. 1, layers 202, 204, and 206 of FIG. 2, layers 302, 304, 306, and 308 of FIG. 3, etc.). Multilayer structures 504 and 506 also contain layers as described herein. Thermal shielding 500 may contain any number of multilayer structures which contain any number of layers. In one embodiment, multilayer structures 502, 504, and 506 are so formed as to be conformable or moldable. In another embodiment, multilayer structures 502, 504, and 506 are capable of being machined and formed into a desired shape. In one embodiment, multilayer structures 502, 504, and 506 are laterally patterned in order to impede heat transfer perpendicular to the layers of multilayer structures 502, 504, and 506. The patterning can be used to channel heat flow along desired paths (e.g., heat path 212 of FIG. 2). For example, thermal shielding 500 may be configured for use on an aircraft. In another example, thermal shielding may be coupled to an electronic device in a hostile environment.

Figure 6:
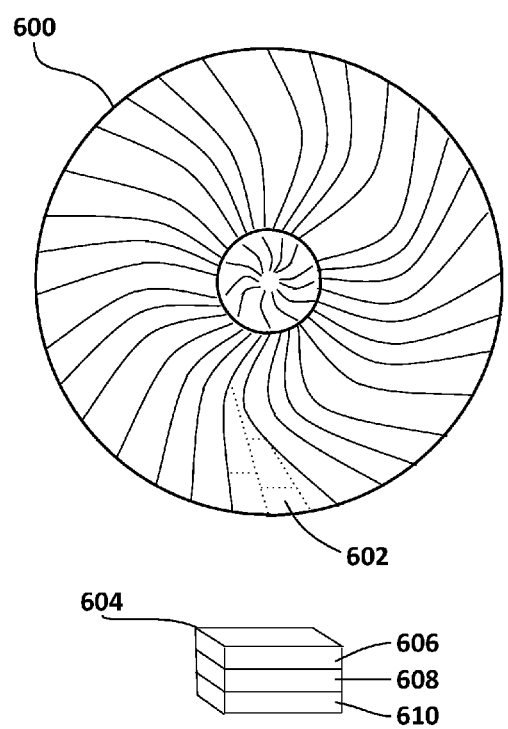
FIG. 6 is a schematic diagram of a thermal shielding coupled to a turbine blade, shown according to an exemplary embodiment.

Referring to FIG. 6, thermal shielding 602 is shown as coupled to a blade of turbine 600. Thermal shielding 602 may be thermal shielding as described herein (e.g., thermal shielding 500 of FIG. 5). Thermal shielding 602 contains a plurality of multilayer structures 604. Each multilayer structure 604 may be a multilayer structure as described herein (e.g., multilayer structure 100 of FIG. 1, multilayer structure 200 of FIG. 2, multilayer structure 300 of FIG. 3, etc.). Each layer 606, 608, and 610 of multilayer structure 604 may be a layer as described herein (e.g. layers 102, 104, and 106 of FIG. 1, layers 202, 204, and 206 of FIG. 2, layers 302, 304, 306, and 308 of FIG. 3, etc.). In one embodiment, turbine 600 is a steam turbine and thermal shielding 602 is used to insulate the blades of turbine 600. Thermal shielding 602 is further used to direct thermal energy away from the blades. In another embodiment, turbine 600 is a gas turbine and thermal shielding 602 is used to insulate the blades of turbine 600. Thermal shielding 602 may be used to direct thermal energy along a desired path.

Figure 7:
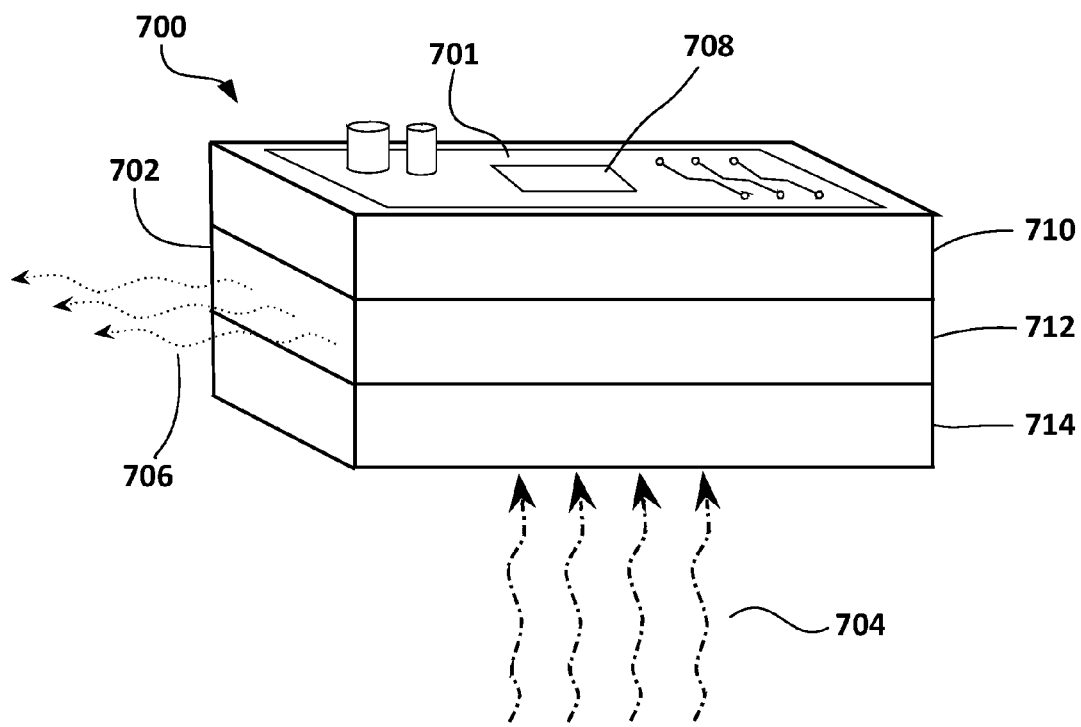
FIG. 7 is a schematic diagram of a thermal insulator coupled to an electronic device, shown according to an exemplary embodiment.

Referring to FIG. 7, a schematic diagram of system 700 is shown according to an exemplary embodiment. System 700 includes insulator 702, which is shown as coupled to electronic device 701. Electronic device 701 contains thermal sensor 708. Insulator 702 is constructed from a multilayer structure as described herein (e.g., multilayer structure 100 of FIG. 1, multilayer structure 200 of FIG. 2, multilayer structure 300 of FIG. 3, etc.). Each layer 710, 712, and 714 of insulator 702 may be a layer as described herein (e.g. layers 102, 104, and 106 of FIG. 1, layers 202, 204, and 206 of FIG. 2, layers 302, 304, 306, and 308 of FIG. 3, etc.). Thermal energy 704 is shown as flowing along heat path 706, away from electronic device 701. Alternatively, layers 710, 712, and 714 may be configured with bandgaps selected to transmit only certain phonon frequencies and modes in order to allow thermal sensor 708 to sense temperatures through insulator 702. As an example, thermal sensor 708 may be used as part of a temperature monitoring circuit on electronic device 701.

Figure 8:
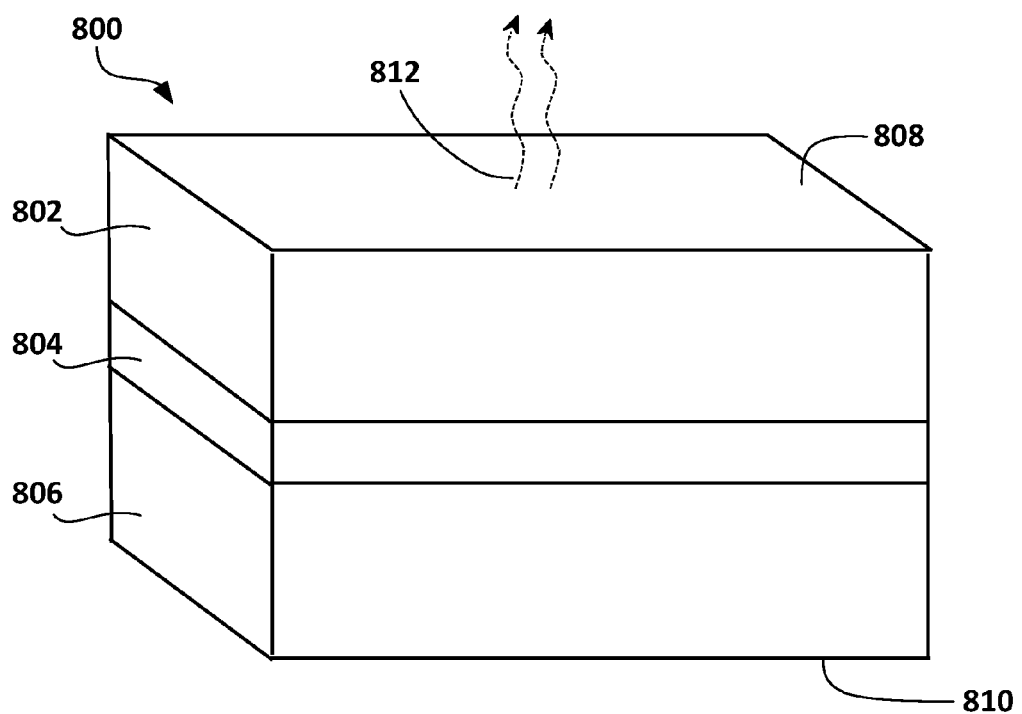
FIG. 8 is a schematic diagram of multilayer structure comprised of phononic crystal layers and non-phonic crystal layers, and a heat path is shown according to an exemplary embodiment.

Referring to FIG. 8 a schematic diagram of multilayer structure 800 is shown according to an exemplary embodiment. Multilayer structure 800 is shown as having two layers of phononic crystals, 802 and 806, and a non-phononic crystal layer 804. Although depicted as only three layers, it should be understood that the scope of the present disclosure is not limited to any particular number of phononic crystal and non-phononic crystal layers. Phononic crystal layers 802 and 806 each have phononic bandgaps. Phononic crystal layers 802 and 806 of multilayer structure 800 may also be arranged as described herein, e.g., as in multilayer structure 100 of FIG. 1, multilayer structure 200 of FIG. 2, etc. Non-phononic crystal layer 804 may be arranged in any order with respect to phononic crystal layers 802 and 806. In one embodiment, the placement of non-phononic crystal layer 804 is determined based on a certain application of multilayer structure 800.

FIG. 8 is further shown as having regions 808 and 810, and heat path 812. Region 808 is at one end of multilayer structure 800, and region 810 is at the other end. Heat path 812 is shown in a direction that is normal to layers 802, 804, and 806, however, alternative heat paths and orientations are envisioned. In one embodiment, the bandgaps of layers 802 and 806 correspond to a certain temperature range that is desired to be blocked. By blocking thermal transporting phonons having frequencies within the temperature range, region 808 is thermally isolated from region 810. In another embodiment, the bandgaps of layers 802 and 806 are selected to facilitate the propagation of only certain phonon frequencies and modes.

It is important to note that the construction and arrangement of the elements of the systems and methods as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the enclosure may be constructed from any of a wide variety of materials that provide sufficient strength or durability, in any of a wide variety of colors, textures, and combinations. Additionally, in the subject description, the word "exemplary" is used to mean serving as an example, instance or illustration. Any embodiment or design described herein as "exemplary" is not necessarily to be construed as preferred or advantageous over other embodiments or designs. Rather, use of the word exemplary is intended to present concepts in a concrete manner. Accordingly, all such modifications are intended to be included within the scope of the present inventions. The order or sequence of any process or method steps may be varied or re-sequenced according to alternative embodiments. Any means-plus-function clause is intended to cover the structures described herein as performing the recited function and not only structural equivalents but also equivalent structures. Other substitutions, modifications, changes, and omissions may be made in the design, operating conditions, and arrangement of the preferred and other exemplary embodiments without departing from scope of the present disclosure or from the spirit of the appended claims.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

What is claimed is:

1. A phononic bandgap thermal insulator, comprising:
a plurality of layers, at least some of the layers comprising phononic crystals having a phononic bandgap, wherein heat transporting phonons within a selected range of frequencies are substantially blocked by each phononic crystal layer, and wherein the layers comprising phononic crystals are interspersed with vibrationally mismatched isolation layers to form distinct phononic crystal layers;
wherein the plurality of layers thermally isolate a first region from a second region, wherein the first region is at one end of the plurality of layers and the second region is at the other end of the plurality of layers, and wherein the layers are arranged in at least one of an increasing and a decreasing order based on a phononic bandgap frequency of the phononic bandgaps to form a continuous gradation of bandgaps between the first and second regions.

2. The thermal insulator of claim 1, wherein the selected range of frequencies is based on a thermal frequency spectrum for a selected temperature range.

3. The thermal insulator of claim 1, wherein a phononic bandgap associated with a first layer overlaps a phononic bandgap associated with a second layer.

4. The thermal insulator of claim 1, wherein an edge of a phononic bandgap associated with a first layer matches an edge of a phononic bandgap associated with a second layer.

5. The thermal insulator of claim 1, wherein the order is monotonically based, such that the layers are arranged in at least one of a monotonically increasing phononic bandgap frequency and a monotonically decreasing phononic bandgap frequency.

6. The thermal insulator of claim 1, wherein layers are arranged in a sequence having bandgap jumps throughout the thermal insulator.

7. The thermal insulator of claim 1, wherein at least one layer comprises at least one of doping atoms, nanoparticles, nanowires, nanocrystals, nanopores, lithographically defined features, nano-machined nano holes, nanofibers, and nanofilaments.

8. The thermal insulator of claim 1, wherein at least one layer comprises voids defined within the layer in order to alter that layer's phononic bandgap.

9. The thermal insulator of claim 1, wherein a frequency of the phononic bandgap of one of the plurality of layers is selected to impede heat transfer perpendicular to that layer.

10. The thermal insulator of claim 1, wherein a frequency of the phononic bandgap of one of the plurality of layers is selected to enhance anisotropic heat flow, enhancing a ratio of along-layer heat flow to that of across-layer heat flow.

11. The thermal insulator of claim 1, wherein at least one phononic bandgap is selected to allow phonon transmission of only a particular wavelength frequency.

12. The thermal insulator of claim 1, wherein phononic crystals associated with at least one layer comprise a periodic array of a solid material and a liquid material.

13. The thermal insulator of claim 1, wherein phononic crystals associated with at least one layer comprise a periodic array of a solid material and a gaseous material.

14. The thermal insulator of claim 1, wherein phononic crystals associated with at least one layer comprise quasicrystals.

15. A thermally insulated system, comprising:
a plurality of laterally arranged thermal insulators each comprising:
a plurality of layers, at least some of the layers comprising phononic crystals having a phononic bandgap, wherein heat transporting phonons within a selected range of frequencies are substantially blocked by each phononic crystal layer, and wherein the layers comprising phononic crystals are interspersed with vibrationally mismatched isolation layers to form distinct phononic crystal layers;
wherein the plurality of layers inhibits heat flow therethrough; and
wherein the layers are arranged in at least one of an increasing and a decreasing order based on a phononic bandgap frequency of the phononic bandgaps to form a continuous gradation of bandgaps;
wherein each of the thermal insulators are coupled to at least one other thermal insulator.

16. The system of claim 15, wherein the laterally arranged thermal insulators are configured to channel heat transporting phonons to flow along a desired path.

17. The system of claim 15, wherein the laterally arranged thermal insulators are configured to channel heat transporting phonons to flow away from a non-desired path.

18. The system of claim 15, wherein the selected range of frequencies is based on a thermal frequency spectrum for a selected temperature range.

19. The system of claim 15, wherein a phononic bandgap associated with a first layer overlaps a phononic bandgap associated with a second layer.

20. The system of claim 15, wherein an edge of the phononic bandgap associated with a first layer matches an edge of a phononic bandgap associated with a second layer.

21. The system of claim 15, wherein the order is monotonically based, such that the layers are arranged in at least one of a monotonically increasing phononic bandgap frequency and a monotonically decreasing phononic bandgap frequency.

22. The system of claim 15, wherein at least one layer comprises voids defined within the layer in order to alter that layer's phononic bandgap.

23. The system of claim 15, wherein a frequency of the phononic bandgap of at least one of the layers is selected to impede heat transfer perpendicular to that layer.

24. The system of claim 15, wherein a frequency of the phononic bandgap of at least one of the layers is selected to enhance anisotropic heat flow, enhancing a ratio of along-layer heat flow to that of across-layer heat flow.

25. A method for providing thermal insulation, comprising:
providing a plurality of layers, at least some of the layers comprising phononic crystals having a phononic bandgap, wherein heat transporting phonons within a selected range of frequencies are substantially blocked by each phononic crystal layer, and wherein the layers comprising phononic crystals are interspersed with vibrationally mismatched isolation layers to form distinct phononic crystal layers; and
arranging the plurality of layers into a multilayer structure, wherein the plurality of layers thermally isolates a first region from a second region, wherein the first region is at one end of the plurality of layers and the second region is at the other end of the plurality of layers; and
wherein the layers are arranged in at least one of an increasing and a decreasing order based on a phononic bandgap frequency of the phononic bandgaps to form a continuous gradation of bandgaps between the first and second regions.

26. The method of claim 25, further comprising arranging a plurality of the multilayer structures laterally and spacing them at a specified distance from one another.

27. The method of claim 26, wherein the arrangement of the multilayer structures is configured to channel heat transporting phonons to flow along a desired path.

28. The method of claim 26, wherein the arrangement of the multilayer structures is configured to channel heat transporting phonons to flow away from a non-desired path.

29. The method of claim 25, further comprising configuring the phononic bandgaps based on a thermal frequency spectrum of a temperature range.

30. The method of claim 25, wherein at least one phononic bandgap associated with a first layer overlaps a phononic bandgap associated with a second layer.

31. The method of claim 25, wherein an edge of a phononic bandgap associated with a first layer matches an edge of a phononic bandgap associated with a second layer.

32. The method of claim 25, further comprising removing material from at least one layer to create voids within the layer in order to alter that layer's phononic bandgap.

33. The method of claim 25, wherein a frequency of the phononic bandgap of at least one of the layers is selected to impede heat transfer perpendicular to that layer.

34. The method of claim 25, wherein a frequency of the phononic bandgap of at least one of the layers is selected to enhance anisotropic heat flow, enhancing a ratio of along-layer heat flow to that of across-layer heat flow.

* * * * *